No. 642,575. Patented Feb. 6, 1900.
G. BOTY & L. MOREAU.
ROLLER BEARING.
(Application filed July 13, 1898.)
(No Model.) 3 Sheets—Sheet 2.
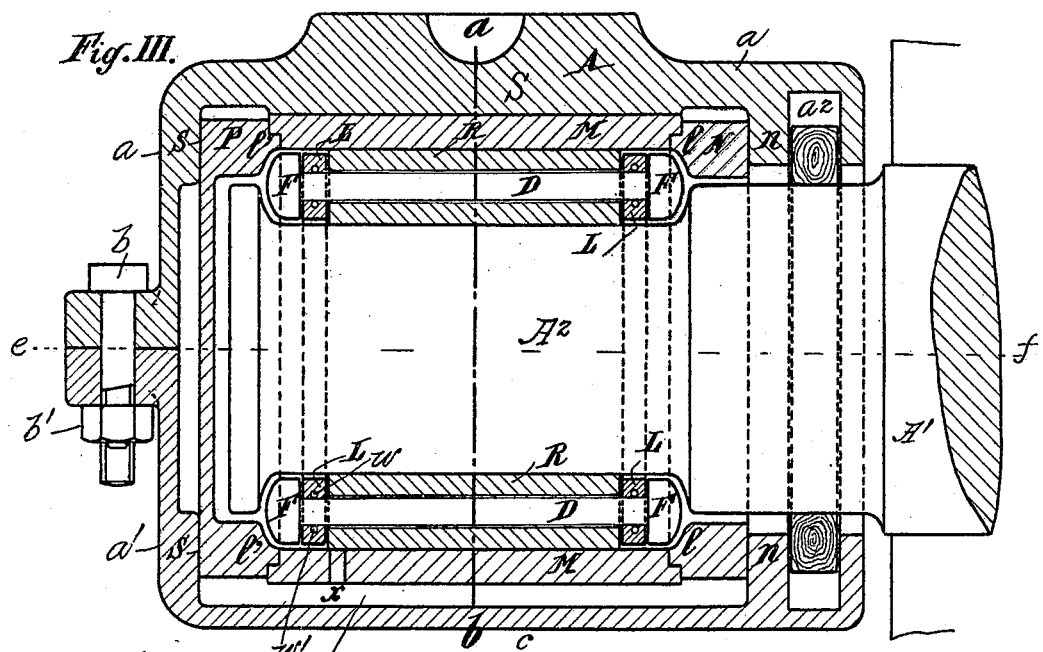
Fig. III.
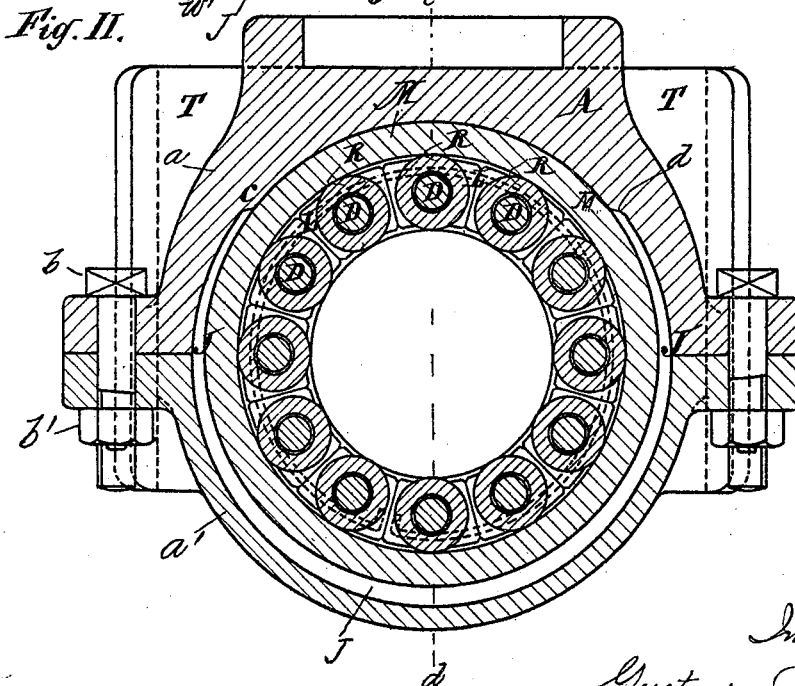
Fig. II.
Witnesses.
Inventors
Gustave Boty.
Leon Moreau.
by
Atty.

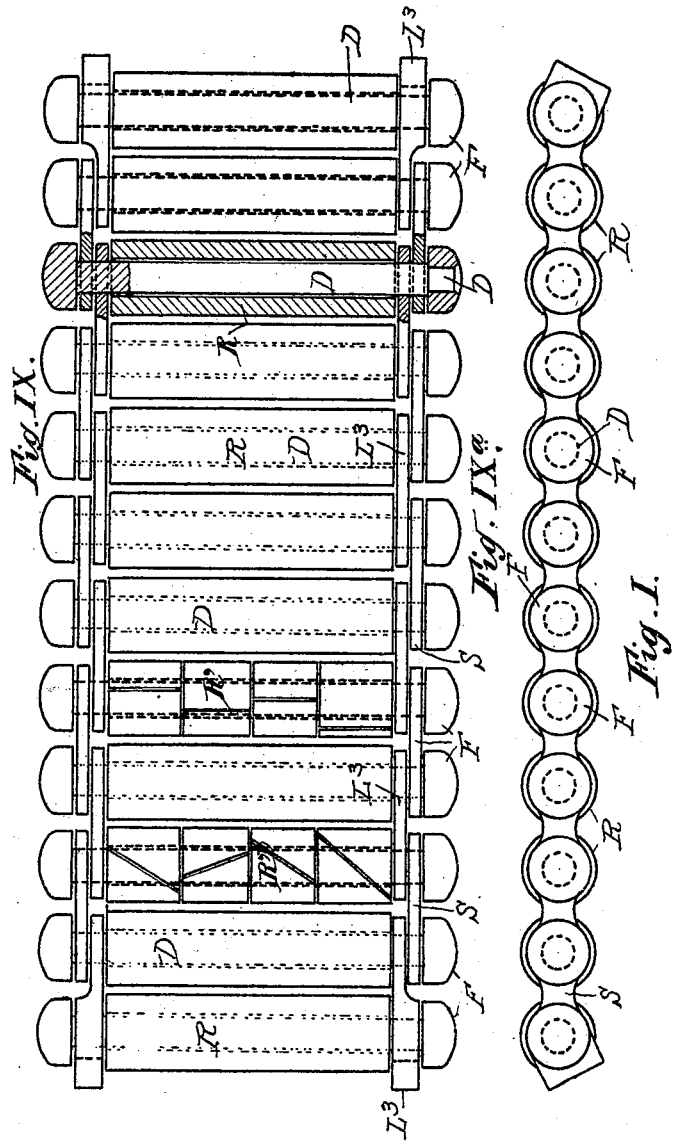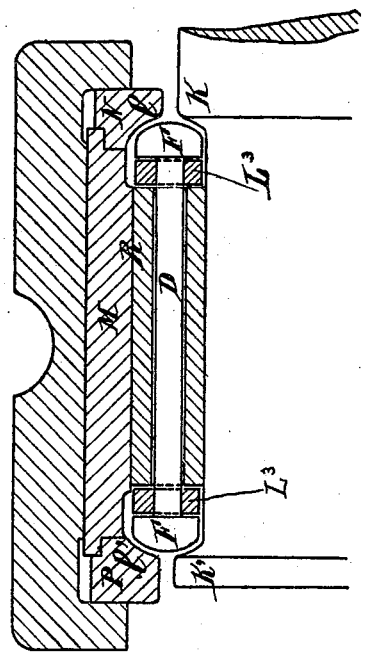

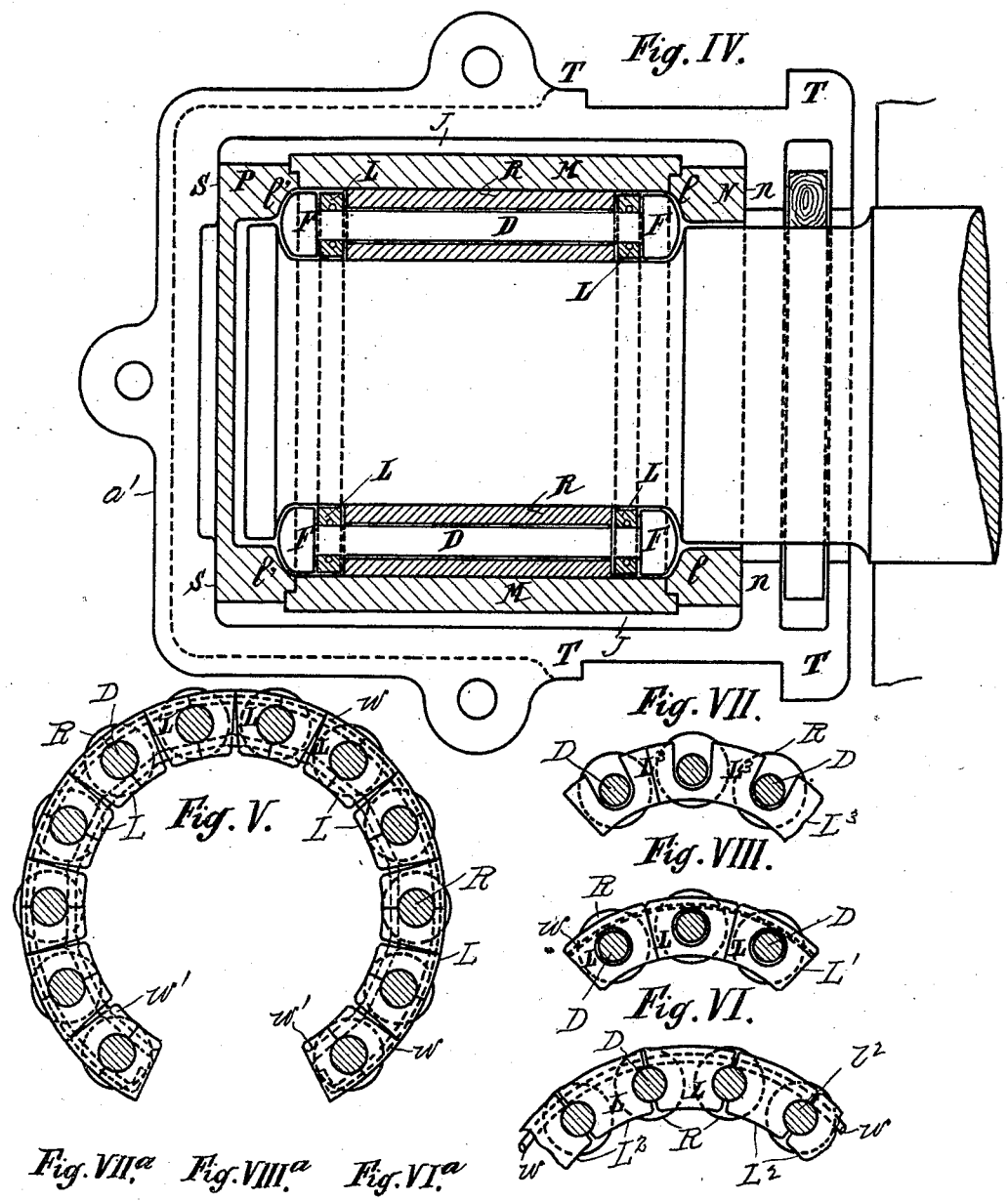

UNITED STATES PATENT OFFICE.

GUSTAVE BOTY AND LEON MOREAU, OF BRUSSELS, BELGIUM.

ROLLER-BEARING.

SPECIFICATION forming part of Letters Patent No. 642,575, dated February 6, 1900.

Application filed July 13, 1898. Serial No. 685,846. (No model.)

*To all whom it may concern:*

Be it known that we, GUSTAVE BOTY and LEON MOREAU, of Brussels, Belgium, have invented certain new and useful Improvements in Roller-Bearings; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has relation to rolling bearings for shaft or axle journals, and more particularly for the axle-journals of railway or tramway rolling-stock.

As is well known, the axle-boxes of vehicles are subjected to various strains—as, for instance, vertical strain, due to the load on the boxes, horizontal strain in a plane parallel with the axis of rotation of the axles, due to lateral or swaying motion of the vehicle, and horizontal strain on a plane at right angles to the axis of rotation of the axle, due to the forward or backward thrust of the load in starting or stopping.

So far as we are aware the object of all rolling bearings heretofore used is simply to reduce friction, and incidentally to relieve the axle-boxes as much as possible of the vertical strain due to the load thereon, no provision having been made for relieving the axle-boxes from strain due to lateral and forward or backward thrusts.

Our invention has for its object a journal-bearing constructed to relieve the axle-boxes from strain in any direction; and it has for its further object to simplify the construction of axle-boxes for railway and tramway rolling-stock, as will now be fully described, reference being had to the accompanying drawings, in which—

Figure 1 is a fragmentary longitudinal sectional view of our improved journal-bearing applied to an axle or shaft journal. Fig. 2 is a vertical transverse section of an axle-box provided with our improved journal-bearing, taken on line $a\,b$ of Fig. 3, which is a longitudinal vertical sectional view of the axle-box and bearing and the journal of a vehicle-axle, said section taken on line $c\,c$ of Fig. 2. Fig. 4 is a horizontal sectional view taken on line $e\,f$ of Fig. 3. Fig. 5 is an end view of a chain of rollers forming part of our improved journal-bearing. Figs. 6, 7, and 8 are similar fragmentary views illustrating modifications in the means of spacing the rollers. Figs. $6^a$, $7^a$, and $8^a$ are fragmentary longitudinal sectional views of the modified means for spacing the rollers shown in Figs. 6, 7, and 8, respectively. Fig. 9 is a top plan view of a chain of rollers, illustrating a modification in the construction of the bearing-rollers; and Fig. $9^a$ an end view thereof.

Our improved journal-bearing comprises, essentially, a box or housing and a chain of rollers surrounding the revoluble journal. The housing is composed of a cylindrical hollow body or sleeve M and of two heads N and P. The latter may be a solid plate, as shown, or simply a ring-shaped head which may be formed integral with the sleeve M. The inner faces of the heads N and P are recessed, the faces of the recesses being concave, as shown at $l\,l'$, Figs. 1, 3, and 4, and constitute arcs of circles complementary to arcs of circles formed at the points where the journal $A^2$ joins its end flange and the axle $A'$, respectively, thus forming concave recesses for the convex heads F on the roller-spindles D of the roller-bearing.

The roller-bearing consists of a chain of rollers R, mounted loosely on spindles D, the outer ends of which are enlarged to form heads F, whose outer faces are convex, as above stated. The spindles D are somewhat shorter than the chamber in housing M N P, and the rollers R are of greater diameter than the heads F of said spindles, so that there is a clear space all about said heads for the purpose of avoiding frictional contact between them and the axle-journal and the heads of the housing. It is of course necessary that the roller-spindles be held at a suitable distance from one another to avoid frictional contact between them, and this may be effected in various ways.

Spacing-plates L, made in two parts, each provided with a half-bearing, as shown in Fig. 5, may be used, or spacing-plates $L^2$, provided in their outer faces with a half-bearing $l^2$, may be used, as shown in Fig. 6, or a separate spacing-plate L' may be used for each spindle, as shown in Fig. 8, or spacing-plates $L^3$, having bearings for more than one roller-spindle D, may be used, as shown in Fig. 7.

The bearings for the spindles may be open either outwardly, as shown in Fig. 7, or inwardly, and the bearing-plates may be interconnected, as by means of a wire $w$, wound around the ring of spacing-plates within an outer groove therein, as shown in Figs. 6 and 8, or by means of two such wires wound around the ring of plates in an outer and inner groove of said plates, as shown at $w$ and $w'$, Fig. 5.

In the arrangement shown in Figs. 9 and $9^a$ spacing-plates $L^3$ are shown, each having bearings for two roller-spindles D, said plates being connected together by metallic straps S, connecting two spindles having their bearings in adjacent plates.

From the description of the construction of our improved journal-bearing it is evident that it constitutes in itself a complete bearing and may be used as such, as shown in Fig. 1, or it may be placed in an axle-box, as shown in Figs. 2, 3, and 4, in which case the housing M P N is made of such a length as to fit snugly against the opposite inner faces $s$ and $n$ of the axle-box A, the cylindrical body M being provided with one or more holes $x$ for the passage of the lubricant from the axle-box to the bearing-rollers R and journal $A^2$.

We prefer to divide the axle-box horizontally into two parts $a$ and $a'$, each provided with bolt-flanges for securing said parts together by means of bolts $b$ and nuts $b'$.

The axle-box A has a chamber J for the reception of the aforesaid bearing-box M P N, and a portion of the inner face of said chamber—namely, from the point $c$ to the point $d$ in the upper half of the axle-box—is concentric with the longitudinal axis of the roller-housing and constitutes what is usually termed the "saddle," the remaining portion of said chamber J being eccentric to said axis. The object of this construction is twofold: first, to form a chamber partly around the roller-housing for lubricant, and, secondly, to provide shoulders at the said points $c$ and $d$, on which the axle-box A can rock. The two halves of the axle-box are or may be provided with heel-pieces T, fitting around the arms of the axle-guard.

From the above description it will readily be seen that the vertical strain is exerted, as usual in roller-bearings, upon the rollers R. The lateral strain or thrust in one or the other direction, due to the swaying or displacement of the load in a plane parallel with the axis of rotation of the axles, is taken up by the heads F of the roller-spindles D, while the thrusts on the axle-boxes in a horizontal plane at right angles to the axis of rotation of the axles and occurring in starting and in stopping are practically nullified, in that the axle-boxes are displaced on the bearing-box by rocking on one or the other shoulder formed at the points $c$ and $d$, according as the thrust is in a forward or rearward direction, the saddle S being partly lifted off the cylindrical body M of the bearing-box, as will be readily understood.

Inasmuch as the lateral strain is not exerted on or taken up by the rollers R, we are enabled to make these rollers in sections, the sections being split sleeves and the split being either parallel with the longitudinal axis of the roller-spindles D, as shown at R', Fig. 9, or oblique thereto, as shown at R'' in said Fig. 9.

Having thus described our invention, what we claim as new therein, and desire to secure by Letters Patent, is—

1. A journal-bearing comprising a series of spaced spindles, rollers loosely mounted thereon and arranged to form a circular bearing for a journal to revolve in, said spindles provided with a convex head at each end; in combination with a cylindrical housing in which said circular roller-bearing is fitted, and a confining device at each end of the housing provided with concave surfaces facing the heads of the aforesaid spindles, for the purpose set forth.

2. A journal-bearing comprising a series of rollers, spindles on which said rollers are loosely mounted, said spindles provided at each end with a convex head of less diameter than that of the rollers, and spacing devices for the spindles interposed between their heads and their rollers, said parts arranged to form a circular bearing for a journal to revolve in; in combination with a cylindrical housing in which said bearing is fitted and a confining device at each end of said housing having a concave surface facing the convex heads of the roller-spindles, for the purpose set forth.

3. The combination with an axle-journal, a roller-bearing therefor, and a cylindrical housing in which said bearing is fitted and confined; of a box for said housing provided with a chamber, a portion of the inner face of which is eccentric to the longitudinal axis of the aforementioned housing, the remaining portion of said chamber-surface being concentric with said axis and seating on said housing, for the purpose set forth.

4. The combination with an axle-journal, a bearing therefor, comprising a series of spaced spindles and rollers loosely mounted thereon and arranged to form a circular bearing for the journal to revolve in, said spindles having a convex head at each end of less diameter than that of their rollers, a cylindrical housing in which said bearing is fitted and in which the spindles thereof have endwise play, and a confining device at each end of the housing provided with concave surfaces facing the spindle-heads; of a box for said housing provided with a chamber the greater portion of the inner surface of which is eccentric to the longitudinal axis of the aforesaid housing the remaining portion being concentric with said axis and seating on such housing, substantially as and for the purpose set forth.

5. The combination with an axle-journal, a roller-bearing for said journal, and a cylindrical housing in which said bearing is confined; of a box for said housing provided with a chamber, a portion of the inner surface of which is eccentric to and the remaining portion concentric with the longitudinal axis of said housing and seating thereon, and means for placing the interior of the housing in communication with said chamber, substantially as and for the purpose set forth.

6. The combination with an axle-journal, a roller-bearing for said journal and a housing in which said bearing is confined; of a box for said housing divided horizontally into separably-connected parts constructed to form an internal chamber, the greater portion of the inner surface of which is eccentric to and the remaining portion within the upper part concentric with the longitudinal axis of the aforesaid housing and seating thereon, substantially as and for the purpose set forth.

In testimony that we claim the foregoing as our invention we have signed our names in presence of two subscribing witnesses.

GUSTAVE BOTY.
      LEON MOREAU.

Witnesses:
 CÉLESTIN VERTOMMEN,
 GREGORY PHELAN.